US012705134B2

(12) United States Patent
Kaynak et al.

(10) Patent No.: US 12,705,134 B2
(45) Date of Patent: Aug. 11, 2026

(54) SELECTIVE RELIABILITY UPDATE FOR ERROR DECODING

(71) Applicant: MICRON TECHNOLOGY, INC., Boise, ID (US)

(72) Inventors: Mustafa N. Kaynak, San Diego, CA (US); Mariano Burich, San Diego, CA (US); Sivagnanam Parthasarathy, Carlsbad, CA (US); Eyal En Gad, Freemont, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 13 days.

(21) Appl. No.: 18/910,459

(22) Filed: Oct. 9, 2024

(65) Prior Publication Data

US 2026/0099405 A1 Apr. 9, 2026

(51) Int. Cl.
*G06F 11/10* (2006.01)

(52) U.S. Cl.
CPC ........ *G06F 11/106* (2013.01); *G06F 11/1004* (2013.01)

(58) Field of Classification Search
CPC .............. G06F 11/106; G06F 11/1004; H03M 13/1111; H03M 13/1108; H03M 13/116; H03M 13/1102; H03M 13/1128; H03M 13/611; H03M 13/255; H03M 13/3927; H03M 13/1185; H03M 13/1177; H03M 13/1105
USPC .......................................................... 714/764
See application file for complete search history.

(56) References Cited

U.S. PATENT DOCUMENTS

| | | | | |
|---|---|---|---|---|
| 8,438,459 | B2 | 5/2013 | Cho et al. | |
| 8,819,515 | B2 * | 8/2014 | Chen ................. | H03M 13/2957 714/752 |
| 8,929,009 | B2 * | 1/2015 | Yang .................. | G11B 20/1833 360/39 |
| 9,191,256 | B2 | 11/2015 | Vojcic et al. | |
| 9,385,753 | B2 | 7/2016 | Varnica et al. | |
| 10,411,735 | B1 * | 9/2019 | Chilappagari ....... | H03M 13/116 |
| 10,417,089 | B2 | 9/2019 | Oboukhov et al. | |
| 10,707,899 | B2 | 7/2020 | Bhatia et al. | |
| 11,381,253 | B1 * | 7/2022 | Asadi ................. | H03M 13/1148 |
| 11,881,871 | B1 * | 1/2024 | Zhang ................ | H03M 13/1128 |

(Continued)

*Primary Examiner* — Albert Decady
*Assistant Examiner* — Osman M Alshack
(74) *Attorney, Agent, or Firm* — Tarolli, Sundheim, Covell & Tummino LLP

(57) ABSTRACT

A method for decoding data includes determining that a codeword received from a memory device has errors and assigning responsive to the determining, a reliability value to bits of the codeword for a low-density parity check (LDPC) code. The LDPC code employs an irregular H matrix to decode data. The method includes iteratively executing decoding operations until a termination condition is met. The decoding operations include determining whether to skip a reliability update for a selected bit in the codeword based on a collated skipping pattern, a column weight of the selected bit and an iteration count of the decoding operations and omitting updating of the reliability value responsive to the selected bit being skipped. The decoding operations include determining whether each parity check defined in the LDPC code is satisfied. The method further includes outputting a corrected codeword based on final reliability values for bits in the codeword.

18 Claims, 5 Drawing Sheets

(56) References Cited

U.S. PATENT DOCUMENTS

| | | | | |
|---|---|---|---|---|
| 2019/0052288 | A1* | 2/2019 | Gunnam | H03M 13/116 |
| 2022/0329260 | A1* | 10/2022 | Li | H03M 13/1111 |
| 2023/0163785 | A1* | 5/2023 | Lee | H03M 13/1134<br>714/752 |
| 2024/0022262 | A1* | 1/2024 | Roth | H03M 13/015 |
| 2024/0204799 | A1* | 6/2024 | Chung | H03M 13/114 |
| 2024/0421832 | A1* | 12/2024 | Zhang | H03M 13/096 |

* cited by examiner

SELECTIVE RELIABILITY UPDATE FOR ERROR DECODING

TECHNICAL FIELD

This disclosure relates to selectively updating a reliability value of bits during Low-Density Parity-Check (LDPC) decoding to correct errors in data.

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices.

Low-Density Parity-Check (LDPC) codes are a type of error-correcting code employed to transmit data over communication channels with high efficiency and reliability. LDPC codes are characterized by a sparse parity-check matrix, which predominantly consists of zeros with a relatively low-density of ones. LDPC codes facilitate efficient implementation of decoding algorithms such as Belief Propagation and Min-Sum.

DETAILED DESCRIPTION

Figure 1:
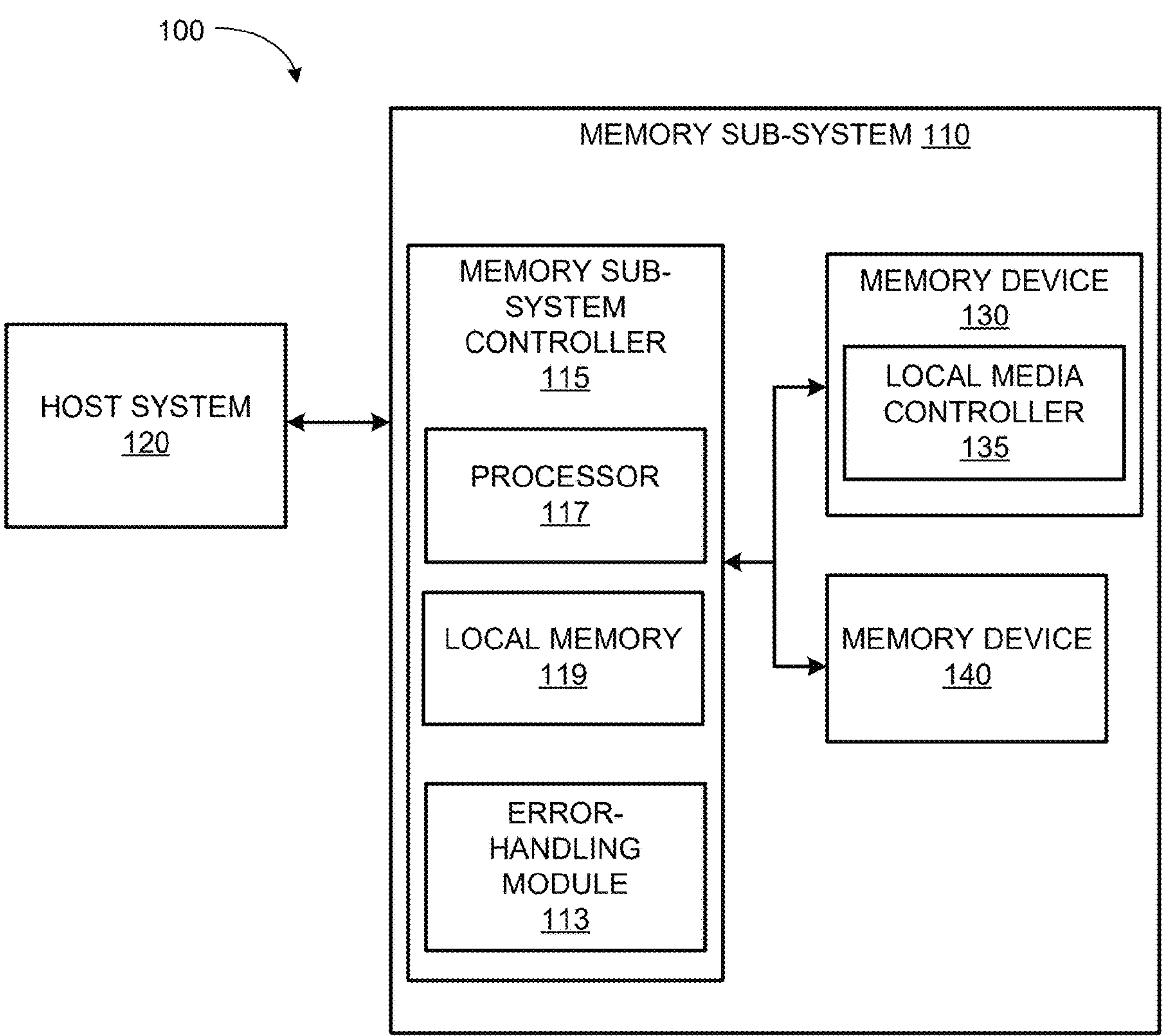
FIG. 1 illustrates a system for decoding data from a memory sub-system.

This description is related to systems and methods to improve the performance of Low-density Parity Check (LDPC) decoders (such as MinSum decoders) by selectively skipping reliability updates for certain codeword bits during specific iterations of the decoding process. This approach is designed for irregular LDPC codes with multiple column weights (CWs) and involves analyzing a convergence speed of bits with different CWs through decoder simulations. To determine a skipping pattern for the reliability updates, a cost metric is employed to balance the trade-off between correction capability and decoder latency, allowing for adjustable prioritization based on system requirements. By tuning the skipping pattern through multiple simulations, the overall decoding time can be reduced, which can, in turn, improve system throughput, particularly in scenarios with predictable input bit error rate distributions. The LDPC decoders are employable for hard input decoding in non-volatile memory subsystems to address the growing demand for high-throughput error correction of memory devices.

More generally, some examples of a memory sub-system include high density non-volatile memory devices where retention of data is desired during intervals of time where no power is supplied to the memory device. One example of non-volatile memory devices is a not-AND (NAND) memory device. A non-volatile memory device is a package that includes a die(s). Each such die can include a plane(s). For some types of non-volatile memory devices (e.g., NAND memory devices), each plane includes a set of physical blocks, and each physical block includes a set of pages. Each page includes a set of memory cells, which are commonly referred to as cells. A cell is an electronic circuit that stores information. A cell stores at least one bit of binary information and has various logic states that correlate to the number of bits being stored. The logic states are represented by binary values, such as ‘0’ and ‘1’, or as combinations of such values, such as ‘00’, ‘01’, ‘10’ and ‘11’.

A memory device includes multiple cells arranged in a two-dimensional or a three-dimensional grid. In some examples, memory cells are formed on a silicon wafer in an array of columns connected by conductive lines (also referred to as bitlines, or BLs) and rows connected by conductive lines (also referred to as wordlines or WLs). A wordline has a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory devices.

The memory sub-system controller is configured/programmed to encode the host and other data, as part of a write operation, into a format for storage at the memory device(s). Encoding refers to a process of generating parity bits from embedded data (e.g., a sequence of binary bits) using an error correction code (ECC) and combining the parity bits to the embedded data to generate a codeword. LDPC encoding refers to an encoding method that utilizes an LDPC code to generate the parity bits.

The LDPC code is defined by, among other things, a sparse parity-check matrix, alternatively referred to as an H matrix, denoted as H. Each row of the H matrix embodies a linear constraint imposed on a designated subset of data bits. Entries within the H matrix, either ‘0’ or ‘1’, signify the participation of individual data bits in each constraint. Stated differently, each row of the H matrix represents a parity-check equation, and each column corresponds to a bit in the codeword. During the encoding process, parity bits are generated by utilizing the embedded data in conjunction with either the H matrix or the generator matrix, which is derived from the H matrix. The generated parity bits are appended to the embedded data to generate an LDPC codeword. The LDPC codeword includes the embedded data and the parity bits, allowing for identification and rectification of errors. The LDPC codeword is storable at the memory device(s) of the memory sub-system.

Additionally, the memory sub-system controller can decode codewords, as part of a read operation, stored at the memory device(s) of the memory sub-system. Decoding refers to a process of reconstructing the original embedded data (e.g., sequence of binary bits) from the codeword (e.g., the encoded original embedded data) received from storage at the memory device(s). LDPC decoding refers to a decoding method that utilizes the LDPC code to reconstruct the original embedded data.

Initially, during LDPC decoding, the LDPC codeword is compared with the expected relationships encoded in the H matrix. In particular, the LDPC codeword is multiplied by a transpose of the H matrix associated with the LDPC code used to encode the LDPC codeword. The result of the multiplication produces a vector (e.g., a syndrome vector), in which each element corresponds to a specific parity-check equation in the sparse parity-check matrix. A syndrome vector with a zero value signifies that the corresponding parity-check equation is satisfied (e.g., no errors or having even number of bit errors in the parity check equation), and a syndrome vector with a non-zero value indicates potential errors impacting the bits involved in the corresponding parity-check equation. Potential errors, for example, may be due to the bits involved in the corresponding parity-check equation being flipped due to noise, interference, distortion, bit synchronization errors or errors from the media itself (both intrinsic and extrinsic). For example, a bit that may have originally been stored as a '0' may be flipped to a '1' or vice versa.

In response to detection of the potential errors, an algorithm of the LDPC decoding, such as a MinSum (alternatively referred to as min-sum) algorithm, iteratively analyzes the LDPC codeword and estimates the most likely values for the data bits. In particular, the algorithm of the LDPC decoding (e.g., decoding algorithm) is initialized with either hard decisions and/or soft decisions of the LDPC codeword. Hard decisions refer to binary decisions made about the LDPC codeword, where each bit is classified as either '0' or '1' based on a threshold. Soft decisions refer to a likelihood or confidence score indicating how likely each bit is to be classified as either '0' or '1'. In some instances, soft decisions may be represented as a log-likelihood ratio (LLR) set, in which each LLR of the LLR set is a value that indicates a likelihood or confidence score of a bit of the LDPC codeword to be classified as either '0' or '1'. The LLR is a ratio of the probabilities of receiving a particular signal given the bit is '0' versus the bit being '1' or vice versa. A positive LLR (e.g., a positive value) indicates that '0' is a more likely decision, whereas a negative LLR (e.g., a negative value) indicates that '1' is a more likely decision. The magnitude of the LLR indicates the confidence in this decision. A higher magnitude (or larger value) suggests higher confidence in the decision.

Subsequent to initializing the decoding algorithm with either hard decisions or soft decisions of the LDPC codeword, the decoding algorithm, using a tanner graph, iteratively exchanges messages within the tanner graph. The tanner graph refers to a bipartite graph representation of the H matrix of the LDPC code. The tanner graph includes two types of nodes (i) variable nodes (representing the bits of the codeword) and (ii) check nodes (representing the parity-check equations). Each check node is connected to several variable nodes. The decoding algorithm iteratively exchanges messages between variable nodes and check nodes of the tanner graph.

With respect to the decoding algorithm initialized with hard decisions, during each iteration, each check node sends a message to each connected variable node based on the hard decisions. The messages are based on the initialized hard decisions made. That is, the messages indicate a definite '0' or '1'. The variable nodes update their values based on these hard decision messages, and this process repeats iteratively. The decoding algorithm iterates, with each node updating its value based on the incoming messages until the decoding algorithm converges to a stable set of values that satisfy the parity-check equations of the H matrix of the LDPC code or until a maximum number of iterations is reached. In some examples, this decoder can be considered a hard decision decoder where internally, the decoder does not build soft information.

With respect to the soft decoding algorithm initialized with LLRs corresponding to hard or soft decisions, during each iteration, each check node computes and sends a message to each connected variable node based on information check node received from the connected variable nodes. The message reflects the likelihood that a particular bit satisfies the corresponding parity-check equation, given the current estimates of the other bits, based on the initialized soft decisions, involved in that particular parity check. Each connected variable node, based on the message computed by the corresponding check node, and each connected variable node updates its estimate, (e.g., the LLR for the corresponding variable node). Each connected variable node sends back an updated message to the check node, which influences the next message from the check node. This iterative process gradually refines the estimates of the likelihood for each bit, aiming to converge to a consistent set of values that satisfy all parity-check equations of the H matrix of the LDPC code or until a maximum number of iterations is reached. The use of soft decisions in the decoding algorithm generally results in more accurate decoding (e.g., increased reliability of the error-correction capability, i.e., higher error rate that can be corrected by LDPC).

Codeword error rate (CWER) refers to a metric used to quantify a correction capability of the decoding algorithm. Stated differently, CWER reflects the number of codewords out of a collection of codewords that have at least one bit error after the decoding process. A lower CWER implies better decoding performance and higher reliability, while a higher CWER suggests that the algorithm may struggle to effectively correct errors. With respect to using hard information with the decoding algorithm, CWER is functionally dependent on the raw-bit-error-rate (RBER), which is a raw measure of errors occurring in the absence of any correction.

Additionally, LDPC codes come in two main types based on the column weight (CW), which is the number of parity bits with which each codeword bit interacts. Regular LDPC codes have a fixed CW for all codeword bits, while irregular LDPC codes allow for varying CWs. Irregular LDPC codes face unique challenges in the decoding process due to the varying convergence rates of bits with different CWs. In previous LDPC decoders, all bits are updated in every iteration, regardless of a convergence speed of a bit, leading to unnecessary computations and increased decoder latency. This is particularly problematic for irregular LDPC codes because bits with different CWs may require different processing times in hardware, further impacting overall performance. The systems and methods provided in this description address these issues by selectively skipping reliability updates for bits in the codeword with a particular CW during specific iterations, reducing decoding time and improving system throughput for irregular LDPC codes without significantly compromising error correction capability.

The skipping patterns for irregular LDPC codes are calculated through a process involving simulation, analysis and tuning. Initially, LDPC decoder simulations are executed to determine how quickly bits with different CWs converge. This involves analyzing the bit error rates (BER) for each CW over multiple iterations. Additionally, the impact of skipping reliability updates for different column weight bits on various sets of iterations is evaluated. This evaluation considers both improvements in decoder speed and potential impacts on error correction ability. Multiple combinations of iterations are tested for skipping updates on different CWs to determine proposed skipping patterns for bits with each CW. A cost function defining a cost metric is provided that balances a trade-off between error correction capability and decoder speed. This cost metric can be adjusted to prioritize either error correction or speed based on system needs. Further, LDPC decoder simulations are executed with the proposed skipping patterns to identify a set of iterations for each column weight where reliability updates should be skipped to determine a collated skipping pattern for the LDPC decoder that provides a skipping pattern for each column weight in the irregular LDPC code employed by the LDPC decoder. This process for selecting the collated skipping pattern allows for flexible trade-offs between error correction capability and decoder speed, which can be tailored to specific system requirements or error characteristics.

FIG. 1 illustrates a system 100 that includes a memory sub-system 110 that can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller) and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1 illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) or higher, can store multiple bits per cell. In some examples, each of the memory devices 130 can include one or more arrays of memory cells such as SLCs, MLCs, TLCs, QLCs, PLCs or some combination thereof. In some examples, a particular memory device can include an SLC portion, an MLC portion, a TLC portion and/or a QLC portion of memory cells. The memory cells of the memory devices 130 can be grouped as pages that can refer to a logical unit of the memory device used to store data. In some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory devices 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

In various examples, the memory sub-system 110 includes an error-handling module 113 that executes an LDPC decoder programmed to compensate for a range of column weights (CWs) in an irregular H matrix of the LDPC code. The LDPC decoder can execute the MinSum algorithm to implement the decoding process. The error-handling module 113 may be part of the memory sub-system controller 115. Alternatively, the error-handling module 13 may be part of the host system 120, an application or an operating system.

In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these request for reading and/or write data by interacting with the memory sub-system 110, managing the flow of data to and from the memory device 130 and/or the memory device 140 within the memory sub-system 110. This reading and writing of data enables operation of computing systems where data access and management is needed.

Continuing with examples of operation, consider a situation where the host system 120 outputs a read memory command to the memory sub-system controller 115. In response, the memory sub-system controller 115 operates in concert with the local media controller 135 to read memory cells of the memory device 130 and/or the memory device 140. The memory sub-system controller 115 stores retrieved data in the form of codewords (e.g., LDPC codewords formed of a combination of embedded data and parity bits) in the local memory 119. It is presumed that the data that is read from the memory device 130 and the memory device 140 includes hard reads (1H) and soft reads (such as 1H2S, 1H3S, etc). A soft read (1H2S) is a combination of a hard bit (1H) and two soft bits (2S).

The "hard bit" in this context is a binary read of data where each bit is read and immediately interpreted as either a '0' or a '1', based on a fixed read threshold. For example, in NAND flash memory, a voltage level above a certain threshold voltage ($V_t$) might be interpreted as '0', and below that threshold as '1'. Hard reads are quick and require less computational power but provide less information about the reliability of the read bit. The "soft bits" provide additional information about the probability or confidence level of the bit being a '0' or '1'. In the present description, this additional information is represented in terms of likelihoods or probabilities, which can be converted into reliability values such as LLRs for use in decoding algorithms. Soft reads (such as 1H2S) are employable in error correction because soft reads allow a decoder algorithm of the error-handling module 113 to make more informed decisions based on the degree of certainty about each bit's state. Soft reads can be coarser such as 1H1S or finer such 1H3S.

Continuing with the example, the error-handling module 113 parses the codewords in the local memory 119 to detect and correct bit errors. For instance, consider an example where the error-handling module 113 detects that a codeword (e.g., LDPC codeword) read from the memory device 130 and/or the memory device 140 contains bit errors. To detect errors, the error-handling module 113 can multiply a transpose of the irregular H matrix of the LDPC code with the codeword to provide a syndrome vector. Alternatively, this operation can also be performed without making a matrix multiplication by sequentially checking each parity using XOR operations. If the syndrome vector is non-zero, there is at least one error in the codeword. Moreover, the values of the non-zero syndrome vector are employable to identify check nodes of the LDPC code that have failed parity checks.

In some examples, the error-handling module 113 assigns a reliability value, such as an LLR from an LLR set to each bit of the codeword, and inputs the assigned LLR to the LDPC decoder. It is understood that in the examples provided, LLRs are employed as the reliability values. However, in other examples, other values are employable as reliability values. Moreover, to simplify calculations, the LLRs of the LLR set are integer values that are mapped to specific reliabilities. The particular values can be based for example, on the RBER and/or other criteria. The assignment of the input LLR value for each bit is based on a reliability of each bit in the codeword. For example, bits in a codeword that are based on 1H2S soft reads can be assigned an LLR value corresponding to one of a low, medium and high reliability. Additionally, bits in a codeword that are based on hard reads (1H) can be assigned an LLR value corresponding to a medium reliability. Table 1 provides an example for the LLR that correlates a bit value and reliability with a particular LLR value. It is noted that in different examples, other LLR values are employable.

TABLE 1

| Bit Value | Reliability | LLR Value |
|---|---|---|
| 1 | High | −14 |
| 1 | Medium | −10 |
| 1 | Low | −5 |
| 0 | Low | 5 |
| 0 | Medium | 10 |
| 0 | High | 14 |

Each bit in the codeword read from the memory device 130 and/or the memory device 140 has a CW that defines the number of parity checks in which the corresponding bit participates. The calculation or determination of CW for each bit of the codeword with parity errors is related to the structure of the H matrix (parity check matrix) of the LDPC code, which is a binary matrix where rows represent parity checks and columns represent codeword bits. Each entry in the H matrix is either '0' or '1'; a '1' indicates that the corresponding bit is included in the parity check for that row. To calculate the CW for a specific bit, the number of '1's in the column of the H matrix that corresponds to that bit are counted. For example, if a column has three '1's, the CW for that bit is 3, meaning the bit is involved in 3 different parity checks. This count influences the decoding process, as bits with higher CWs get more parity check updates and impact more parity checks, impacting both the error correction capability and the complexity of the decoding process. Moreover, as noted, the memory sub-system 110 has an irregular H matrix, so different bits can have different CWs.

Responsive to generating a codeword LLR (assigning an LLR for each bit in the codeword), the error-handling module 113 initializes the LDPC decoder with the codeword LLR as the decoding parameter. More specifically, each variable node (corresponding to a bit in the codeword) is initialized with the corresponding LLR of the codeword LLR, referred to as initial LLRs denoted as $L_{init}$. These initial LLRs are employed in an iterative process, exchanging messages between variable nodes and associated check nodes. For example, if a variable node V is connected to three check nodes C1, C2 and C3, messages mC1→V, mC2→V and mC3→V (e.g., each mC1 . . . mC3 representing the message that is passed from check node to variable node) would be computed based on existing LLRs and specific rules. As an example, mC1→V should exclude information received from the specific variable node, V. Similarly, any message a variable node sends to a specific check node should exclude information the variable node received from the specific check node. These messages are typically referred to as "extrinsic information".

As noted, the error-handling module 113 employs an LDPC decoder, which implements the MinSum algorithm (alternatively referred to as the min-sum algorithm). The MinSum algorithm is a streamlined decoding algorithm used with LDPC codes, offering a computationally efficient alternative to the more complex Belief Propagation (BP) algorithm. The LDPC decoder operates by iteratively passing messages between variable nodes (representing codeword bits) and check nodes (representing parity checks) within a Tanner graph of the LDPC code. The LDPC decoder implements an iterative error correction process that employs two specific values, min1 and min2. During each iteration, the decoder of the error-handling module 113 operates through a series of message exchanges between the variable nodes and check nodes. Each check node receives messages from connected variable nodes, which contain information about the LLRs of bit values. The check node determines whether the parity condition represents by the check node is satisfied based on these incoming messages.

To update the messages sent back to the variable nodes, the LDPC decoder calculates the two smallest absolute values (min1 and min2) among the incoming messages at each check node. Min1 is the smallest absolute value and min2 is the second smallest. Responsive to determining min1 and min2, the check node updates the outgoing message based on min1 and min2. If a parity check fails, indicating that there is an inconsistency among the bits involved in that check, the check node sends back messages that adjust the reliability values of the connected variable nodes. Specifically, the variable node associated with min1 (the least reliable node based on the incoming messages) receives an update influenced by min2, and every other variable node connected to the check node receives an update influenced by min1. Thus, the LDPC decoder ensures that the least reliable bit is given the most significant adjustment, pushing the least reliable bit towards correction in subsequent iterations. Scalar values and offset values can be applied to min1 and min2 in the LDPC decoder to more closely approximate the operation of a decoder that employs the BP algorithm.

As an example, consider a situation where a scalar value denoted as 's' and offset value denoted as 'o', mC1→V=s*min1 (or min 2)+o where min1 and min2 correspond to smallest/second smallest LLR to check node C1. After the first iteration, the LLR for V would be updated using the formula and the set of decoding parameters (e.g., $L_{new}=(L_{init})+mC1\rightarrow V+mC2\rightarrow V+mC3\rightarrow V$). The process is then repeated for a set number of iterations or until certain conditions are met, using the updated $L_{new}$ as the starting point for the next round. Finally, a hard decision is made based on the resulting $L_{final}$; if $L_{final}>0$, the bit is decoded as '1', and if $L_{final}<0$, it is decoded as '0'. Accordingly, if the LLR of a given bit is changed from positive to negative through an iteration, the bit is flipped from '0' to '1'. Conversely, if the LLR of a given bit is changed from negative to positive through an iteration, the given bit is flipped from '1' to '0'. This iterative mechanism allows for more effective error correction by continually updating the LLRs.

The LDPC decoder executed by the error-handling module 113 has a convergence speed that refers to the rate at which the LDPC decoder corrects errors and approaches the correct codeword during the iterative decoding process. The convergence speed is often measured by analyzing how quickly the bit error rate (BER) decreases over multiple iterations. A faster convergence speed indicates that the LDPC decoder is able to correct errors more rapidly, potentially allowing for earlier termination of the decoding process, enabling higher throughput of the memory sub-system 110.

Figure 2:
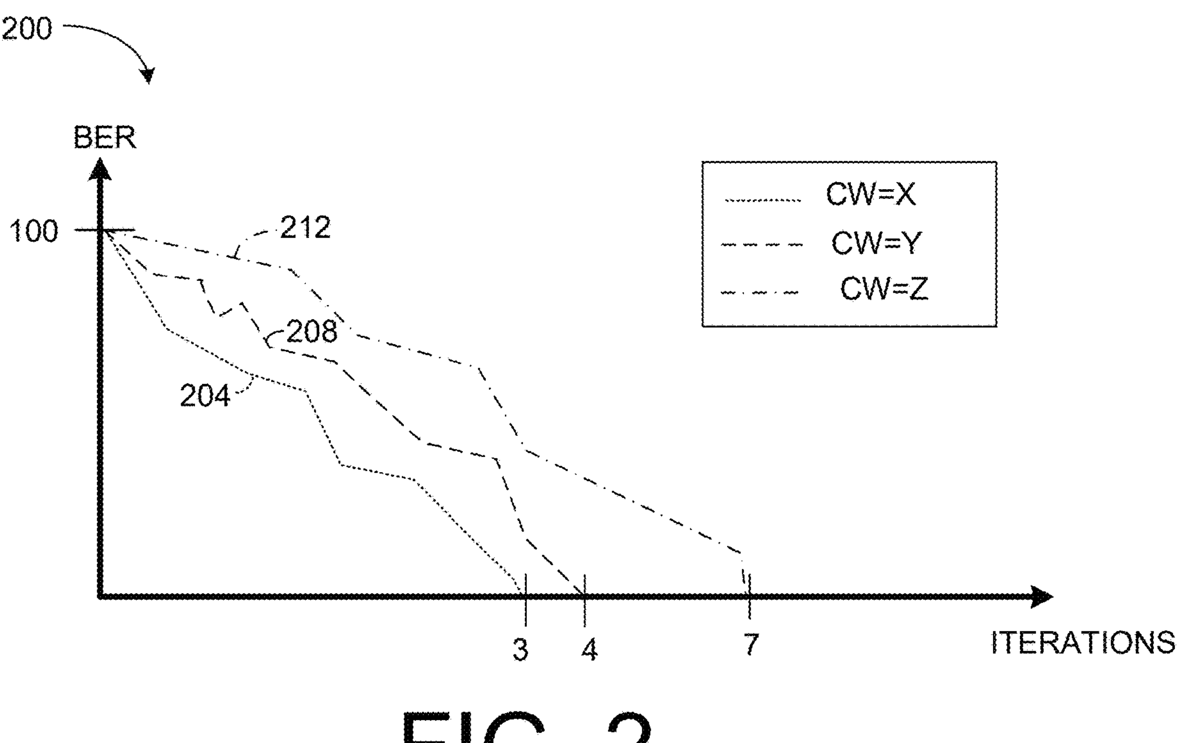
FIG. 2 illustrates a graph that plots a bit error rate as a function of iterations of a LDPC decoder.

Irregular H matrices can have varying convergence speeds for bits with different CWs during the LDPC decoding process. FIG. 2 demonstrates this concept. FIG. 2 illustrates a graph 200 that plots a bit error rate (BER) as a function of a number of iterations executed by the LDPC decoder implemented by the error-handling module 113 for a given codeword (e.g., an LDPC codeword) for a simplified example. The graph 200 includes a first plot 204 that plots the BER of the bits in the given codeword that have CW of X, a second plot 208 that plots the BER for bits in the given codeword that have a CW of Y and a third plot 212 that plots the BER for bits in the given codeword that have a CW of Z. Thus, it is presumed that the H matrix for the example illustrated in FIG. 2 has 3 different CWs, X, Y and Z. Moreover, for this example, Z is equal to 15, Y is equal to 6 and X is equal to 4. Moreover, in the present example, there are 300 errors in the given codeword, and there are 100 bits that have the CW of X, 100 bits that have the CW of Y and 100 bits that have the CW of Z. That is, the number of errors for bits with each CW is equal for illustrative purposes.

As shown by the graph 200, after 3 iterations of the LDPC decoder, the bits with the CW of X are corrected. After 4 iterations of the LDPC decoder, the bits with a CW of Y are corrected. Moreover, after 7 iterations of the LDPC decoder, the bits with a CW of Z are corrected. Accordingly, the bits with the CW of X, Y and Z have different convergence speeds, indicating that some bits are corrected faster than others during decoding. Continuing to update bits that have already converged or are close to convergence wastes computational resources and increases decoder latency. For instance, in the example illustrated in FIG. 2, updating bits with the CW of X after 3 iterations of the LDPC decoder can waste such computational resources. Moreover, in some example implementations, bits with higher CWs may need more clock cycles to process the associated parity checks compared to bits with lower CWs, further impacting overall decoder performance. The previous approach of updating all bits in every iteration does not account for these varying convergence rates, potentially leading to a suboptimal balance between error correction capability and decoding speed.

Referring back to FIG. 1, the LDPC decoder executed by the error-handling module 113 compensates for the varying convergence rates caused by disparate CWs by selectively skipping reliability updates (e.g., updates to reliability values) for certain CW bits during specific iterations, potentially reducing decoding time and improving the throughput of the LDPC decoder without compromising error correction capability. More particularly, the error-handling module 113 provides the LDPC decoder with a collated skipping pattern that includes a skipping pattern for each CW in the LDPC code employed by the LDPC decoder. A skipping pattern for a particular CW refers to a predetermined set of iterations of the LDPC decoding process where reliability updates for bits with the particular CW are intentionally skipped (omitted) by the LDPC decoder. A collated skipping pattern refers to a pattern that defines a combination of skipping patterns for each CW in the LDPC code. Stated differently, the collated skipping pattern lists a subset of iterations of the LDPC decoder where the reliability update is to be skipped for each CW.

The collated skipping pattern can be derived with a multi-part process, that can be implemented for example, with an external computing system. In particular, simulations of the LDPC decoder are executed by the computing system to determine a convergence speed of bits with different CWs. Moreover, these simulations are analyzed to determine the bit error rates (BER) for each CW over multiple iterations. Additionally, the simulations of the LDPC decoder are re-executed with different skipping patterns for each CW to identify an impact of skipping reliability updates for different column weight bits on various sets of iterations, considering both improvements in decoder speed and potential impacts on error correction ability. For instance, as a simplified example, using the example illustrated in FIG. 2, the simulation can be executed wherein the reliability updates for bits with a CW of X are skipped for iterations 4, 6 and 8, namely, and reliability updates for bits with a CW of Y for iterations 5 and 7 where it is likely that bits with the CW of X or Y have already converged (e.g., as indicated by the plot 208). However, in making this determination, hundreds or thousands of different skipping patterns are executed to determine the impact on the LDPC for skipping reliability updates.

A cost function providing a cost metric can be defined by the external computing system to balance the trade-off between error correction capability and decoder speed, which can be adjusted to prioritize either error correction or speed based on system needs. Additionally, extensive LDPC decoder simulations with different skipping patterns can be executed to select a set of iterations for skipping updates for each CW, aiming to maximize the defined cost metric. The output of this process is a set of iterations for each CW where reliability updates should be skipped, which define a skipping pattern for each CW of the LDPC decoder employed by the error-handling module 113. These skipping patterns can be combined to form the collated skipping pattern that can be programmed in the error-handling module 113 and/or stored in the local memory 119, which can be input into the LDPC decoder. Accordingly, the collated skipping pattern lists a subset of iterations of the LDPC decoder where the reliability update is to be skipped for each CW. In some examples, the subset of iterations for each CW is disjointed from the subsets of other CWs. Consequently, in some examples, only bits with a particular (single) CW have updates to reliability values skipped for a particular iteration. In other examples, the subset of iterations (defined in the collated skipping pattern) can indicate that the reliability updates for bits with different CWs can be skipped in the same iteration.

In response to inputting the codeword, the LLRs for each bit of the codeword and the collated skipping pattern, the LDPC decoder initializes the decoding process with either hard decisions or soft decisions (log-likelihood ratios) for each bit in the codeword. The MinSum LDPC begins the iterative decoding process, following the standard MinSum algorithm. During each iteration, for each parity check, the decoder determines whether the parity is satisfied and computes the two lowest reliability values (min1 and min2) among the bits participating in the parity. Based on the check node processing results, the LDPC decoder adjusts the reliability values of the bits, increasing reliability if the parity is satisfied and decreasing if the parity is not satisfied. The LDPC decoder applies the collated skipping pattern to selectively skip reliability updates for certain CW bits at specific iterations. For each iteration, the LDPC decoder checks if the current iteration number matches any of the skip iterations in the collated skipping pattern for each CW. If a match is found, the decoder skips the reliability update for the bits with that CW, moving to the next bit without performing the update calculation. For bits with CWs not scheduled for skipping in the current iteration, the decoder performs the standard reliability update.

After each iteration, the LDPC decoder checks for convergence by verifying if all parity check equations are satisfied or if the maximum number of iterations has been reached. If convergence is achieved or the maximum number of iterations is reached, the LDPC decoder makes the hard decisions on the bits based on their final reliability values, such that positive reliability values are decoded as '0', and negative values are decoded as '1'. The LDPC decoder outputs the corrected codeword to the memory sub-system controller 115. In response, the memory sub-system controller 115 stores the corrected codeword in the local memory 119. In some examples, the memory sub-system controller 115 extracts embedded user data (removing parity data) from the codeword, and the memory sub-system controller 115 can provide the extracted user data to the host system 120, such as in response to a read operation. In other examples, an entity of the codeword is provided to the host system 120.

By implementing this selective updating process based on the collated skipping pattern, the LDPC decoder can reduce overall decoding time and improve throughput for irregular LDPC codes with multiple CWs, while maintaining an acceptable level of error correction capability.

Figure 3:
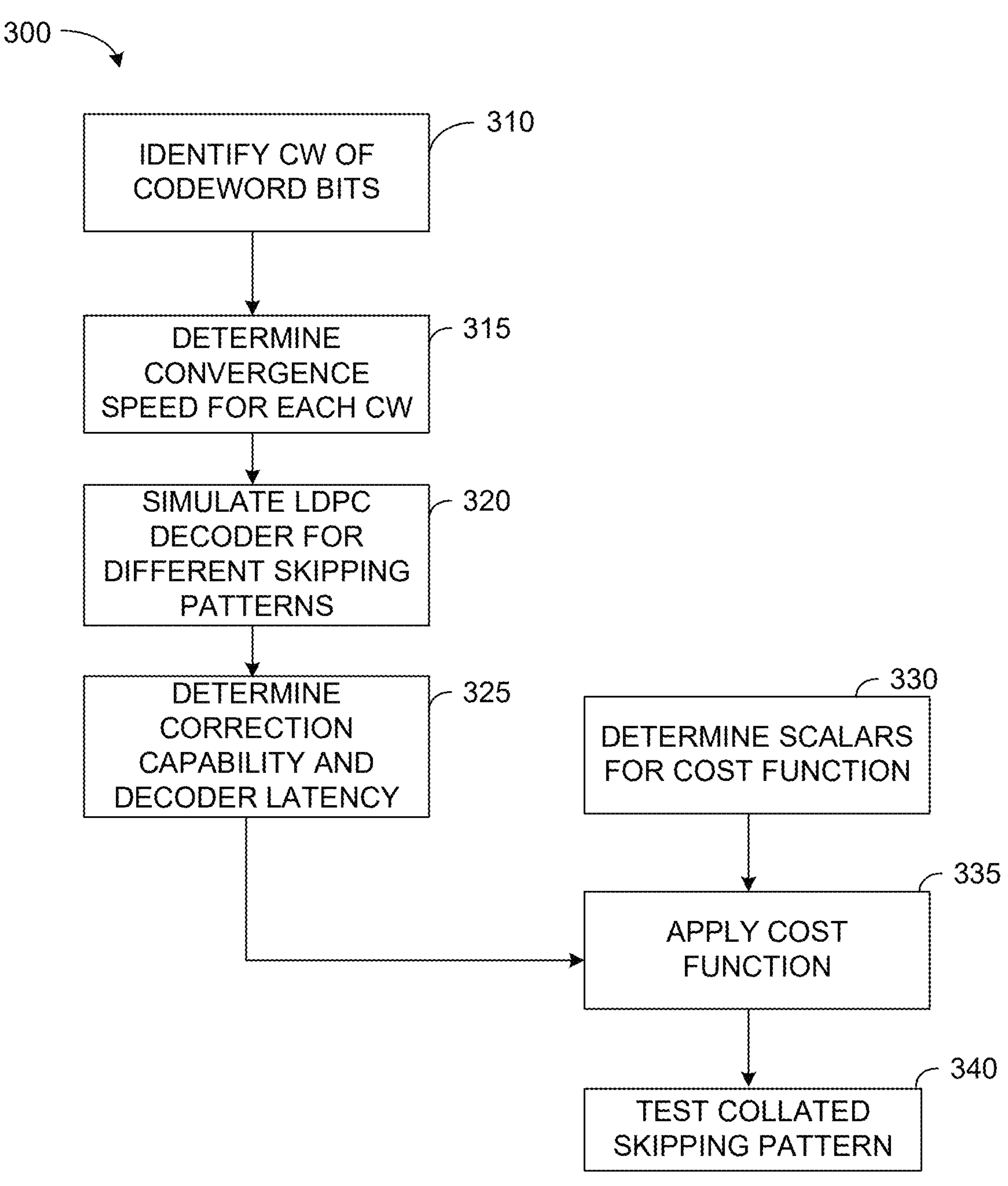
FIG. 3 illustrates a flowchart of an example method for deriving a collated skipping pattern.

FIG. 3 illustrates a flowchart of an example method 300 for determining a collated skipping pattern. The method 300 can be implemented for example, by a computing system that can execute a simulator and analyze results of the simulation. The flowchart method 300 for deriving the collated skipping pattern involves a comprehensive process to tune the LDPC decoder performance for an irregular LDPC code that implements an irregular H matrix (e.g., an H matrix with varying CWs).

At block 310, the CW of bits in codewords for the irregular LDPC code are determined. In a given example (hereinafter, "the given example"), there are 2 different CW, namely a CW of X and a CW of Y, wherein X and Y are positive integers, and X and Y are not equal. In other examples, there could be more CWs in the H matrix. Thus, each bit in the codeword has a CW of either X or Y. Moreover, in the given example X is 5, and Y is 14.

At block 315, a convergence speed for each CW of the LDPC code is determined. Thus, in the given example the convergence speed for the CWs of X and Y are determined. To determine the convergence speed for each CW, the computing system can execute LDPC decoder simulations without constraints to plot the bit error rate (BER) as a function iterations of the LDPC decoder for each of the different CWs. The simulations are executed on codewords that have varying error rates. Moreover, the convergence speed of each CW provides insight into understanding how different parts of the codeword behave during the decoding process.

At block 320, different skipping patterns are simulated for each of the different CWs and different RBERs in the LDPC code to evaluate the impact of skipping reliability updates. This involves testing multiple sets of iterations for skipping updates on different CWs. Additionally, to curtail the number of simulations needed to be executed, the skipping patterns are simulated wherein the bits with CWs with the faster convergence speeds have more skipped iterations of reliability updates than the CWs with the lower convergence speeds. For instance, in the given example, if bits with the CW of X has a convergence speed of 4, and bits with the CW of Y have a convergence speed of 7, the computing system can be configured to simulate the LDPC decoder with skipping patterns having an increased number of iterations of reliability updates skipped for the bits of CW of X, and fewer iterations of reliability updates skipped for the bits with the CW of Y.

At block 325, a decoder latency as a function of RBER and the correction capability (including a potential correction capability degradation) is determined for each skipping pattern tested for each CW of the LDPC code. The decoder latency (as a function of RBER) and the correction capability of the skipping patterns establish the trade-offs between speed and accuracy in the LDPC decoder using different skipping patterns.

At block 330, scalars, SC1 and SC2 for a cost function are determined. The scalar, SC1 is applied to the correction capability term in the cost function, and the scalar, SC2 is the scalar applied to an inverse of a decoder latency term in the cost function. The selection of scalars SC1 and SC2 involves multiple operations and considerations. Initially, scalars SC1 and SC2 are set based on system requirements and priorities, such as an expected RBER for particular memory device (e.g., the memory device 130) properties, with the ability to adjust SC1 and SC2 to fine-tune the balance between error correction capability and decoder latency. The relative values of SC1 and SC2 control the trade-off between these two factors, with a higher SC1 prioritizing correction capability and a higher SC2 emphasizing reduced decoder latency. It is noted that block 330 can be executed in parallel with or at a different time from blocks 310-325.

At block 335, the computing system applies the cost function, CostMetric on the simulated iterations sets to skip. The cost function balances correction capability and latency of the LDPC decoder, allowing for adjustable prioritization based on the system requirements. One example of the cost function can be defined with Equation 1:

$$CostMetric(RBER) = SC1 * CorrectionCapability(RBER) + SC2 * (1/DecoderLatency(RBER)) \quad \text{Equation 1}$$

wherein:

RBER is an expected raw bit error rate for the memory device;

CorrectionCapability (RBER) is the correction capability for a particular skipping pattern at a specific RBER; and DecoderLatency (RBER) defines a latency of the LDPC decoder for a for the particular skipping pattern specific at a specific RBER.

The cost function, CostMetric can be analyzed for each simulated skipping pattern that meets the performance requirements. Moreover, SC1 and SC2 may be adjusted iteratively as the collated skipping pattern is tested with various input RBER distributions. The effectiveness of the chosen scalar values is evaluated by calculating the cost metric for the different skipping patterns to identify the skipping patterns that improve (e.g., maximize) performance. Additionally, the final selection of SC1 and SC2 values is tailored to the specific requirements of the memory sub-system and host system, considering factors such as the need for high throughput in applications like machine learning and AI workloads. The collated skipping pattern is then selected by choosing a tuned set of iterations for skipping updates for each CW that provides the maximum cost in the cost function, such that the collated skipping pattern includes skipping patterns for each CW. This collated skipping pattern represents a balance of performance improvement and error correction capability across all CW in the irregular LDPC code that employs the irregular H matrix.

At block 340, the collated skipping pattern is tested to ensure that the skipping pattern achieves the desired characteristics (e.g., a particular balance of error correction capability and decoder latency). To test the collated skipping pattern, the computing system executes simulations of the LDPC decoder implementing the collated skipping pattern for different RBERs. If the results of the test are acceptable, the collated skipping pattern is selected for implementation by the error-handling module 113. If the results are not acceptable, the method 300 can be re-executed with different parameters (e.g., different scalars, different RBER, etc.). Continuing with the given example, if the LDPC decoder is set to a maximum of 20 iterations, the collated skipping pattern can dictate that for bits with a CW of X (5) skip reliability updates on iterations 9, 12, 15 and 17. Similarly, in the given example, the collated skipping pattern can dictate that bits with a CW of Y (14) skip reliability updates on iterations 7, 14 and 18. Accordingly, in the given example, the collated skipping pattern would define a first subset of iterations to skip reliability updates for the CW X (iterations 9, 12, 15 and 17) and a second subset of iterations to skip reliability updates for the CW of Y (iterations 7, 14 and 18). Moreover, as demonstrated, the first subset of iterations and the second subset of iterations are disjoint subsets.

Figure 4:
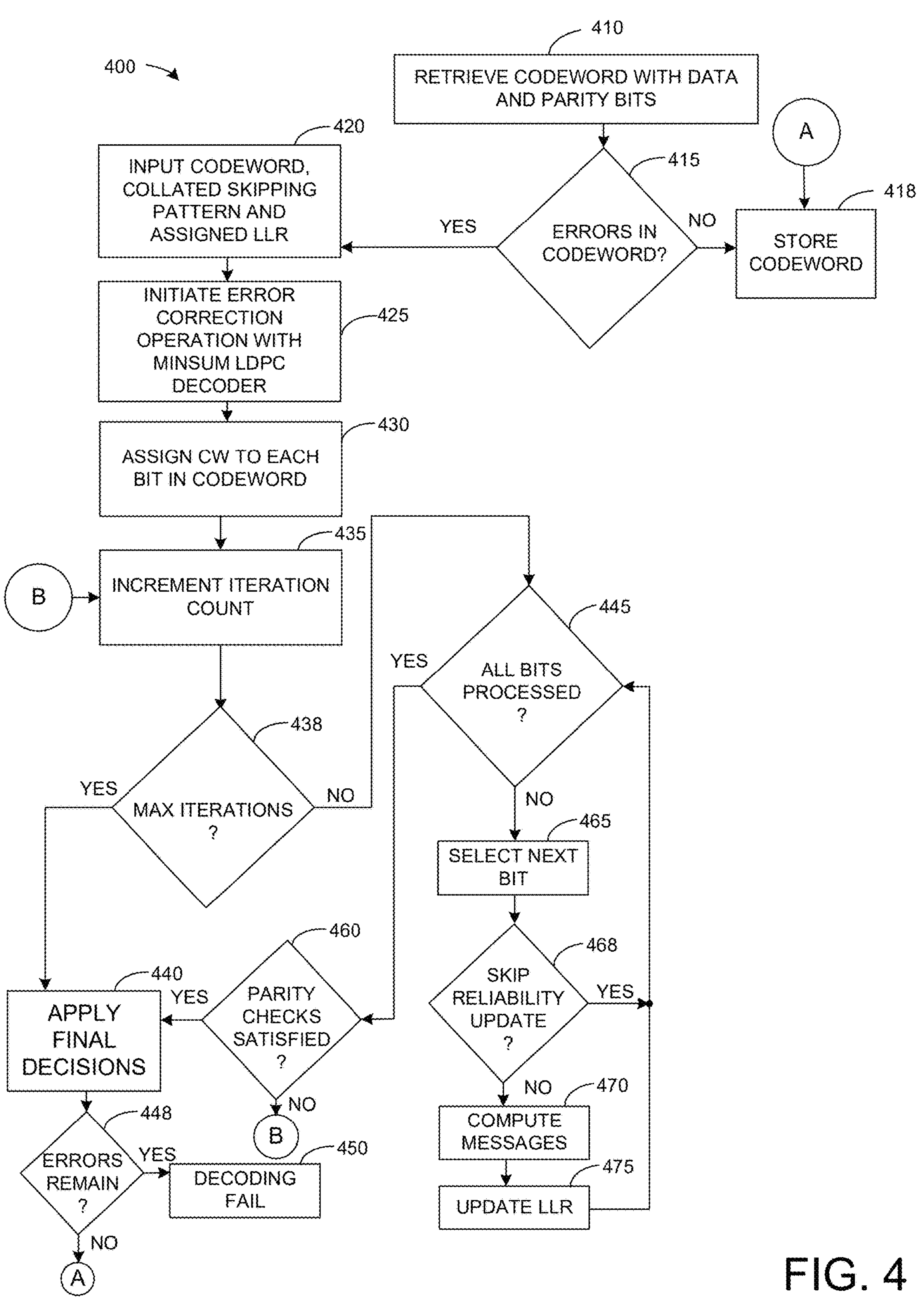
FIG. 4 illustrates a flowchart of an example method for decoding data using a collated skipping pattern.

FIG. 4 illustrates an example of a method 400 for decoding data. The method 400 can be implemented, for example, by a controller, such as the memory sub-system controller 115. For simplification of explanation, the method 400 employs LLRs for reliability values. However, in other examples, other values can be employed. An error-handling module (e.g., the error-handling module 113) has been programmed with or has access to a collated skipping pattern that is employable by a LDPC decoder. At block 410, the controller retrieves a codeword that includes both data and parity bits. This codeword is typically output from a storage device, where the codeword has been previously encoded with LDPC codes that include parity bits for error detection and correction. The bits of the codeword have a reliability (e.g., low, medium or high), as indicated in Table 1.

In block 415, the error-handling module (e.g., the error-handling module 113 of FIG. 1) of the controller determines whether there are errors in the codeword. To make this determination, the error-handling module multiplies the codeword with a transpose of an H matrix of the LDPC code to provide a syndrome vector. Alternatively, this operation can also be performed without making a matrix multiplication by sequentially checking each parity using XOR operations. If the syndrome vector is zero, there are no errors in the codeword. If the syndrome vector is non-zero, there is at least one error in the codeword, and the non-zero value of the syndrome vector is employable to identify check nodes that have failed parity checks. If the determination at block 415 is negative (e.g., NO), the method 400 proceeds to block 418. If the determination at block 415 is positive (e.g., YES), the method 400 proceeds to block 420.

At block 418 (reached when no errors are present in the codeword), the error handling module stores (e.g., outputs) the codeword in a local memory (e.g., the local memory 119) of the controller. The data extracted from the codeword can be output to an external system, such as a host (e.g., the host system 120 of FIG. 1). For instance, in some such examples, in response to detecting that no errors are present in the codeword, the parity bits are removed from the codeword, and the remaining data is provided to the external system, such as in a return operation in response to a read memory request.

At block 420 (reached when error(s) are detected in the codeword), the error-handling module inputs the codeword, a collated skipping pattern to the LDPC decoder and an assigned LLR for each bit of the codeword. The assignment of the LLR is based on the reliability associated with each bit. In some examples, such as situations where the codeword is read with a hard read (1H), each bit in codeword is assigned the same LLR (e.g., corresponding to a medium reliability). In other examples, such as situations where the codeword is read with a soft read (1H2), different bits can have different LLRs.

At block 425, the error-handling module initiates an error correction operation that inputs the codeword, the assigned LLRs and the collated skipping pattern as initiation parameters of the LDPC decoder. The LDPC decoder calculates two minimum values, min1 and min2 (where min2>min1) for the selected parity check node. In some examples, scalar and offsets are applied to min1 and min2.

At block 430, the LDPC decoder assigns a CW to each bit in the codeword. The CW of the codeword is employed to determine if reliability updates the bit are skipped for particular iterations of the LDPC decoder. At block 435, the LDPC decoder increments an iteration counter (e.g., from zero to 1 on a first iteration, and from the Kth iteration to the Kth+1 iteration on subsequent iterations, where K is a positive integer). At block 438, a determination is made as to whether a maximum number of iterations of the LDPC decoder have been exceed. If the determination at block 438 is positive (e.g., YES), the method 400 proceeds to block 440. If the determination at block 438 is negative (e.g., NO), the method 400 proceeds to block 445.

At block 440, the LDPC decoder makes a final decision for each bit in the codeword based on a current LLR of, and the method 400 proceeds to block 448. At block 448, the error handling module makes a determination as to whether errors remain in the codeword (e.g., by calculating a syndrome vector with operations similar to those of block 415). If the determination at block 448 is positive (e.g., YES), the method 400 proceeds to block 450. If the determination at block 448 is negative (e.g., NO), the method 400 proceeds to Node A, which flows to block 418. At block 450, the decoding of the codeword is determined to have failed, such that remedial operations may be considered.

At block 445 (executed if the number of iterations of the LDPC decoder does not exceed the maximum), the LDPC decoder makes a determination as to whether all bits of the codeword have been processed. If the determination at 445 is positive (e.g., YES), the method 400 proceeds to block 460. If the determination at block 445 is negative (e.g., NO), the method 400 proceeds to 465. At block 460, the LDPC decoder makes a determination as to whether the parity checks defined in the H matrix are satisfied (e.g., using the current LLR values). If the determination at block 460 is positive (e.g., YES), the method 400 proceeds to block 440. If the determination at block 460 is negative (e.g., NO), the method 400 proceeds to Node B, which flows to block 435 to start a next iteration of the LDPC decoder. In this manner, decoding operations are iteratively executed by the LDPC decoder until a termination condition is met (e.g., a maximum number of iterations has been executed, as determined in block 438 or the parity checks are satisfied, as determined in block 460)

At block 465 (executed if there is at least one unprocessed bit, as determined in block 445), the LDPC decoder selects a next (unprocessed) bit in the codeword. At block 468, the LDPC decoder makes a determination as to whether to skip reliability updates for the selected bit. The determination at block 468 is based on the collated skipping pattern, the CW of the selected bit and the present iteration number for the LDPC decoder. For instance, in the given example, if the CW of the selected bit is X (e.g., 5) and the present iteration of the LDPC decoder is 9, 12, 15 or 17, the reliability update of the selected bit would be skipped. Continuing with the given example, if the CW of the selected bit is Y (e.g., 14), and the present iteration of the LDPC decoder is 7, 14 or 18, the reliability update of the selected bit would be skipped. That is, the determination at block 468 enforces the skipping pattern for each CW of the LDPC code specified in the collated skipping pattern. If the determination at block 468 is positive (e.g., YES), the method 400 returns to 445. If the determination at block 468 is negative (e.g. NO), the method 400 proceeds to block 470.

At block 470, the LDPC decoder computes check node messages for the selected bit of the codeword. Each check node sends a message based on min1 and min2 values using the MinSum algorithm. At block 475, the LDPC decoder updates the LLR of the selected bit based on the computed messages, and the method 400 returns to block 445. Stated differently, block 470 and block 475 update the reliability value for the selected bit. Additionally, in situations where the determination at block 468 was positive (e.g., YES), the operations of the updating the reliability of the selected bit is omitted for the present iteration.

This method 400 incorporates the collated skipping pattern to selectively skip reliability updates for certain column weight bits at specific iterations. This approach aims to reduce overall decoding time and improve throughput for irregular LDPC codes without significantly compromising error correction capability. In particular, by selectively skipping the reliability updates of bits in the codeword based on the CW and the collated skipping pattern, the method 400 balances the trade-off between thorough error correction and improved decoding speed to enhance the overall performance of LDPC decoding, particularly for irregular LDPC codes used in high-throughput applications such as non-volatile memory subsystems.

Figure 5:
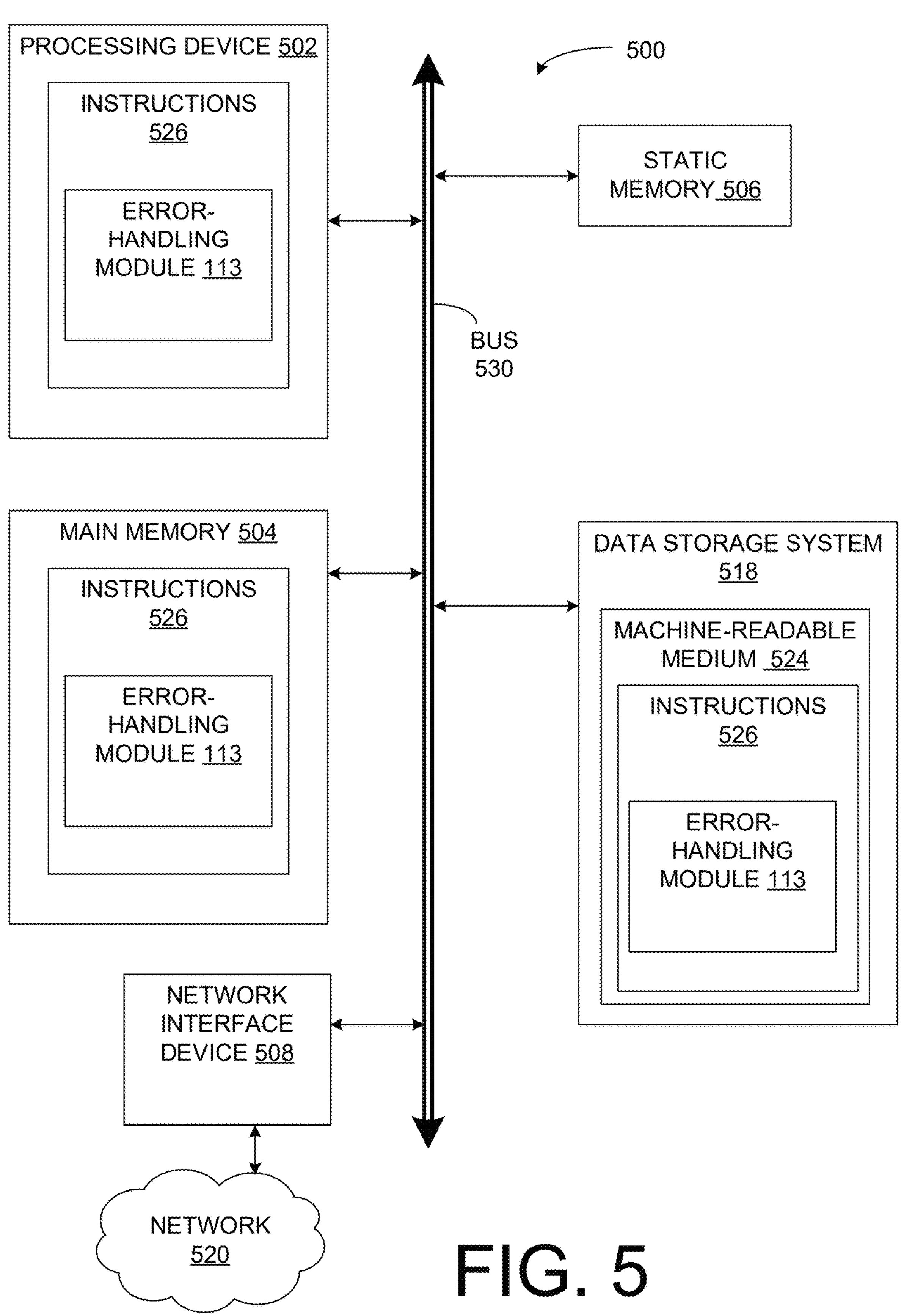
FIG. 5 illustrates an example of a computer system (a machine) in which examples of the present description may operate.

FIG. 5 illustrates an example machine of a computer system 500 (a machine) within which a set of instructions, for causing the machine to perform any one or more of the methodologies discussed herein, can be executed. In some examples, the computer system 500 corresponds to a host system (e.g., the host system 120 of FIG. 1) that includes, is coupled to, or utilizes a memory sub-system (e.g., the memory sub-system 110 of FIG. 1) or is used to perform the operations of a controller (e.g., to execute an operating system to perform operations corresponding to the error-handling module 113 of FIG. 1). In some examples, the computer system 500 is employed to implement the features of an external computing system, such as the method 300 of FIG. 3. In other examples, the machine is connected (e.g., networked) to other machines in a LAN, an intranet, an extranet and/or the Internet. In various examples, the machine operates in the capacity of a server or a client machine in client server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automobile, a data center, a smart factory or other industrial application. Further, while a single machine is illustrated, the term "machine" shall also be taken to include any collection of machines that individually or jointly execute a set (or multiple sets) of instructions to perform the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM) or other non-transitory computer-readable media) and a data storage system 518, which communicate with each other via a bus 530.

The processing device 502 represents one or more general-purpose processing devices such as a microprocessor, a central processing unit, etc. More particularly, the processing device 502 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 502 is implemented with a special-purpose processing devices such as an application specific integrated circuit (ASIC), a field programmable gate array (FPGA), a digital signal processor (DSP), network processor, etc. The processing device 502 is configured to execute instructions 526 for performing the operations discussed herein. In some examples, the computer system 500 includes a network interface device 508 to communicate over the network 520.

The data storage system 518 includes a machine-readable storage medium 524 (also known as a computer-readable medium) that store sets of instructions 526 or software for executing the methodologies and/or functions described herein. The machine-readable storage medium 524 is a non-transitory medium. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518 and/or main memory 504 can correspond to the memory sub-system 110 of FIG. 1. Accordingly, the machine-readable storage medium 524, the data storage system 518 and/or the main memory 504 are examples of non-transitory computer-readable media.

In some examples, the instructions 526 include instructions to implement functionality corresponding to the error-handling module 113 of FIG. 1. While the machine-readable storage medium 524 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for decoding data, comprising:

determining by an error-handling module of a controller, that a codeword received from a memory device has errors;

assigning, by the error-handling module responsive to the determining, a reliability value to bits of the codeword for a low-density parity check (LDPC) code, wherein the LDPC code employs an irregular H matrix to decode data;

iteratively executing, by the error-handling module, decoding operations until a termination condition is met, the decoding operations comprising:

selecting a bit in the codeword;

determining whether to skip a reliability update for the selected bit in the codeword based on a collated skipping pattern, a column weight of the selected bit and an iteration count of the decoding operations, wherein the collated skipping pattern is tuned using a cost function that balances correction capability and decoder latency and the cost function is defined to consider correction capability, decoder latency and bit error rate, with adjustable scalar values to prioritize either correction capability or decoding speed;

updating the reliability value of the selected bit based on computed check node messages responsive to the selected bit not being skipped, and omitting the updating responsive to the selected bit being skipped; and determining whether each parity check defined in the LDPC code is satisfied based on an updated reliability values of the bits in the codeword; and outputting, by the error-handling module, a corrected codeword based on final reliability values for bits in the codeword.

2. The method of claim 1, further comprising reading with a hard read by the controller, the codeword from a memory device.

3. The method of claim 1, wherein the collated skipping pattern defines a skipping pattern for each column weight defined in the irregular H matrix.

4. The method of claim 3, wherein the collated skipping pattern indicates that each column weight skips a subset of iterations of the decoding operations.

5. The method of claim 4, wherein the subset for each column weight is disjointed from the subset for each other column weight.

6. The method of claim 1, wherein the termination condition comprises either each parity checks being satisfied or a maximum number of iterations of the decoding operations has been executed.

7. The method of claim 1, wherein the collated skipping pattern is determined based on simulations of convergence speeds for different column weights.

8. The method of claim 1, wherein the reliability values are log-likelihood ratio (LLR) values.

9. The method of claim 1, wherein the LDPC decoder implements a MinSum algorithm for decoding the codeword.

10. A system for decoding data stored in a memory sub-system, comprising:

a memory device; and a processing device coupled to the memory, the processing device to perform operations comprising:

determining that a codeword received from a memory device has errors;

assigning, responsive to the determining, a reliability value to bits of the codeword for a low-density parity check (LDPC) code, wherein the LDPC code employs an irregular H matrix to decode data;

iteratively executing decoding operations until a termination condition is met, the decoding operations comprising:

selecting a bit in the codeword;

determining whether to skip a reliability update for the selected bit in the codeword based on a collated skipping pattern, a column weight of the selected bit and an iteration count of the decoding operations, wherein the collated skipping pattern is tuned using a cost function that balances correction capability and decoder latency and the cost function is defined to consider correction capability, decoder latency and bit error rate, with adjustable scalar values to prioritize either correction capability or decoding speed;

updating the reliability value of the selected bit based on computed check node messages responsive to the selected bit not being skipped, and omitting the updating responsive to the selected bit being skipped; and determining whether each parity check defined in the LDPC code is satisfied based on updated reliability values of the bits in the codeword; and outputting a corrected codeword based on final reliability values of the bits in the codeword.

11. The system of claim 10, the operations further comprising reading with a hard read, the codeword from a memory device.

12. The system of claim 10, wherein the collated skipping pattern defines a skipping pattern for each column weight defined in the irregular H matrix.

13. The system of claim 12, wherein the collated skipping pattern indicates that each column weight skips a subset of iterations of the decoding operations.

14. The system of claim 10, wherein a subset of each column weight is disjointed from the subset of each other column weight.

15. The system of claim 10, wherein the collated skipping pattern is determined based on simulations of convergence speeds for different column weights.

16. A non-transitory computer-readable storage medium comprising instructions that, when executed by a processing device, cause the processing device to perform operations comprising:

determining by an error-handling module of a controller, that a codeword received from a memory device has errors;

assigning, by the error-handling module responsive to the determining, a reliability value to bits of the codeword for a low-density parity check (LDPC) code, wherein the LDPC code employs an irregular H matrix to decode data;

iteratively executing decoding operations until a termination condition is met, the decoding operations comprising:

selecting a bit in the codeword;

determining whether to skip a reliability update for the selected bit in the codeword based on a collated skipping pattern, a column weight of the selected bit and an iteration count of the decoding operations, wherein the collated skipping pattern is tuned using a cost function that balances correction capability and decoder latency and the cost function is defined to consider correction capability, decoder latency and bit error rate, with adjustable scalar values to prioritize either correction capability or decoding speed;

updating the reliability value of the selected bit based on computed check node messages responsive to the selected bit not being skipped, and omitting the updating responsive to the selected bit being skipped; and determining whether each parity check defined in the LDPC code is satisfied based on an updated reliability values of the bits in the codeword; and outputting a corrected codeword based on final reliability values.

17. The non-transitory computer-readable storage medium of claim 16, wherein the collated skipping pattern indicates that each column weight skips a subset of iterations of the decoding operations.

18. The non-transitory computer-readable storage medium of claim 16, wherein the collated skipping pattern is determined based on simulations of convergence speeds for different column weights.

* * * * *